United States Patent [19]

Emma et al.

[11] Patent Number: 5,155,831
[45] Date of Patent: Oct. 13, 1992

[54] DATA PROCESSING SYSTEM WITH FAST QUEUE STORE INTERPOSED BETWEEN STORE-THROUGH CACHES AND A MAIN MEMORY

[75] Inventors: Philip G. Emma, Danbury, Conn.; Joshua W. Knight, Mohegan Lake, N.Y.; James H. Pomerene, Chappaqua, N.Y.; Rudolph N. Rechtschaffen, Scarsdale, N.Y.; Frank J. Sparacio, Sarasota, Fla.

[73] Assignee: International Business Machines Corporation, Armonk, N.Y.

[21] Appl. No.: 342,493

[22] Filed: Apr. 24, 1989

[51] Int. Cl.⁵ .............. G06F 9/06; G06F 9/312; G06F 9/46; G06F 12/02
[52] U.S. Cl. .................. 395/425; 364/229; 364/230.1; 364/238; 364/239.6; 364/242; 364/243.41; 364/243.45; 364/243.6; 364/244.3; 364/247.3; 364/254.5; 364/255.1; 364/DIG. 1
[58] Field of Search ... 364/200 MS File, 900 MS File; 395/800, 425, 375, 325, 600, 650, 400, 725, 775

[56] References Cited

U.S. PATENT DOCUMENTS

| | | | |
|---|---|---|---|
| 4,167,782 | 9/1979 | Joyce et al. | 395/325 |
| 4,195,340 | 3/1980 | Joyce et al. | 395/425 |
| 4,394,731 | 7/1983 | Flusche et al. | 395/425 |
| 4,415,970 | 11/1983 | Swenson et al. | 395/425 |
| 4,521,851 | 6/1985 | Trubisky et al. | 395/375 |
| 4,530,052 | 7/1985 | King et al. | 395/650 |
| 4,533,995 | 8/1985 | Christian et al. | 395/250 |
| 4,597,044 | 6/1986 | Circello | 395/650 |
| 4,633,387 | 12/1986 | Hartung et al. | 395/650 |
| 4,775,955 | 10/1988 | Liu | 395/425 |

OTHER PUBLICATIONS

"Cache Memories", A. J. Smith, Computing Surveys, vol. 14, No. 3, Sep. 1982, pp. 473-530.

*Primary Examiner*—Thomas C. Lee
*Assistant Examiner*—Daniel H. Pan
*Attorney, Agent, or Firm*—Perman & Green

[57] ABSTRACT

A fast queue mechanism is provided which keeps a queue of changes (i.e. store actions) issued by each processor, which queue is accessible by all processors. When any processor issues a store action to a line of memory in the queue, the old data is overwritten with the new data. If the queue does not currently have a corresponding entry, a new entry is activated. Room for the new entry is made by selecting some existing entry, either the oldest or the least recently used, to be removed. An entry that is to be removed is first used to update the line corresponding to it in main memory. After the changes held in the entry to be removed are applied to the old value of the line (from main memory) and the updated value is put back into main memory, the entry in the queue is removed by marking it "empty". When a processor accesses a line of data not in its cache, a cache miss occurs and it is necessary to fetch the line from main memory. Such fetches are monitored by the queue mechanism to see if it is holding changes to the line being fetched. If so, the changes are applied to the line coming from main memory before the line is sent to the requesting processor. After a new entry is made in the queue mechanism, other store actions to the same entry by any processor may occur and usually a number of store actions will occur to the entry before it is removed to make room for another.

11 Claims, 6 Drawing Sheets

# DATA PROCESSING SYSTEM WITH FAST QUEUE STORE INTERPOSED BETWEEN STORE-THROUGH CACHES AND A MAIN MEMORY

FIELD OF THE INVENTION

This invention relates to data processing systems with cache memories and more particularly to a queue buffer mechanism for such data processing systems to operate in a more rapid and efficient manner.

BACKGROUND OF THE INVENTION

In data processing systems where a number of processors share a main memory, each processor is often provided with its own cache memory. Such cache memories improve processor speed and also reduce traffic load on main memory. The fetch traffic created by the processors is largely handled by their individual caches. The store traffic is handled generally in either of two ways. One way is to direct all stores to main memory more or less immediately, so that main memory stays current on all changes. This is a "store-through" cache. The other method is to direct the stores to cache, without immediately updating main memory. The update is done only when a changed cache line is replaced. This type of cache operation is called a "store-in" cache.

In a store-through cache, when a processor encounters a store operation, the data to be stored is sent directly to main memory and also to the processor's cache. If the address line in cache into which the data is being stored is already in the cache, that line is updated with the new data. If the line is not in the cache, no cache action occurs. To maintain cache consistency, all other caches must invalidate the modified line and the storing processor may not fetch from the modified portion of the line until this invalidation operation has been accomplished. In this way, main memory is always updated and no cache contains a line of data that is not updated. The main disadvantage arising from the use of a store-through cache is the amount of store traffic that the main memory must handle. This can create serious traffic bottlenecks when there are a number of processors attempting to access main memory.

A store-in cache has the advantage that it limits the store traffic to main memory. However, with such a cache configuration, it is necessary to insure that a given cache line is being changed by only one processor at a time. This is accomplished by assuring that the line is held exclusively by the processor that is going to change it. If the line is in any other cache, it is invalidated. Subsequently, if another processor wishes to store data at the same line address in its own cache, the processor must obtain the changed line from the first processor, hold it on an exclusive basis, and invalidate the line address in all other caches. This transferring of a line with exclusive status from one processor to another can affect performance if a line is being frequently changed by several processors, since moving the line back and forth can be quite time consuming. This operational situation may be prolonged since a line that is actively being fetched from will tend to stay in the cache and will retain exclusive status indefinitely.

A further description of store-in and store-through cache memories may be found in a tutorial article entitled "Cache Memories", A. J. Smith, Computing Surveys, Volume 14, No.: 3, pages 473-530, September 1982.

Current high performance multi-processors (have up to six processors) use store-in caches despite their disadvantages. They do this because the store traffic of store-through caches would overload the access capability of main memory.

Some processor designs provide a "store stack" which allows store instructions to be signaled as completed when the store data is placed in the stack, rather than only after the store data goes to a cache. The stack holds the result of only one store instruction per entry and entries from the stack are stored in the cache without further modification or processing. No processor can access data in the stack as it is accessible only after it has been stored in the cache. Stores that are pending in the stack must be monitored to insure that no subsequent data or instruction fetch would have been affected by a pending store. The store stack is only a buffer that eases the timing considerations between the pipeline and the cache.

While the prior art is replete with many references to cache memories, the following are representative. In U.S. Pat. No. 4,167,782 to Joyce et al, a data processing system is disclosed which includes a plurality of system units, all connected in common to a system bus (including a main memory and a high speed buffer or cache store). The cache store monitors each communication between system units to determine if it is a communication from a system unit to main memory which will cause the updating of a word location in main memory. If that word location is also stored in the cache, then the word location in cache is updated in addition to the word location in main memory.

In U.S. Pat. No. 4,195,340 to Joyce, a first in, first activity queue for a cache store is described. This consists of a buffer memory that receives all information transferred over a system bus. The system bus connects main memory to a processor, its cache and an input-/output multiplexor. The buffer memory has two related uses. The first use is to keep the cache current with main memory. In this use, when main memory is being updated, i.e. when the processor is storing to main memory, the updated information received by the buffer is used to update the cache. This is done only if the cache contains the item in main memory that is being updated. Otherwise, if the item is not in the cache, there is no need to update the cache and the information in the buffer is discarded.

The other use is to assist in the handling of a cache miss for which it is necessary to obtain the missed information from the main memory and bring it into the cache. The information from main memory is written into the buffer and then it is written into the cache. Also depending on the way that main memory is configured, additional information is brought into the cache which adjoins the data being accessed, anticipating that such data may be later needed.

U.S. Pat. No. 4,415,970 to Swenson which is controllable by a number of processors or storage control units, rather than being controlled by one such unit. A cache memory is provided which stores a command queue (or queues), all of which are accessible to a plurality of storage control units. A storage control unit which is free is then able to access that queue to provide a command to the input/output device.

None of the prior art known to the inventors hereof, enables a multiprocessor system to employ store-through caches while simultaneously keeping store traffic in main memory at a reduced level which is commonly associated with store-in caches.

Accordingly, it is an object of this invention to provide a queue mechanism which enables a multiprocessor system to employ store-through caches.

It is a further object of this invention to provide a queue mechanism which enables reduced traffic to main memory where the multiprocessor system employs store-in caches.

SUMMARY OF THE INVENTION

A fast queue mechanism is provided which keeps a queue of changes (i.e. store actions) issued by each processor, which queue is accessible by all processors. When any processor issues a store action to a line of memory in the queue, the old data is overwritten with the new data. If the queue does not currently have a corresponding entry, a new entry is activated. Room for the new entry is made by selecting some existing entry, either the oldest or the least recently used, to be removed. An entry that is to be removed is first used to update the line corresponding to it in main memory. After the changes held in the entry to be removed are applied to the old value of the line (from main memory) and the updated value is put back into main memory, the entry in the queue is removed by marking it "empty".

When a processor accesses a line of data not in its cache, a cache miss occurs and it is necessary to fetch the line from main memory. Such fetches are monitored by the queue mechanism to see if it is holding changes to the line being fetched. If so, the changes are applied to the line coming from main memory before the line is sent to the requesting processor. After a new entry is made in the queue mechanism, other store actions to the same entry by any processor may occur and usually a number of store actions will occur to the entry before it is removed to make room for another. Since these store actions do not involve main memory, except when the entry is finally removed from the queue mechanism, the queue reduces store traffic to main memory in a similar way and to a similar degree as does a store-in cache.

DETAILED DESCRIPTION OF THE INVENTION

Figure 1:
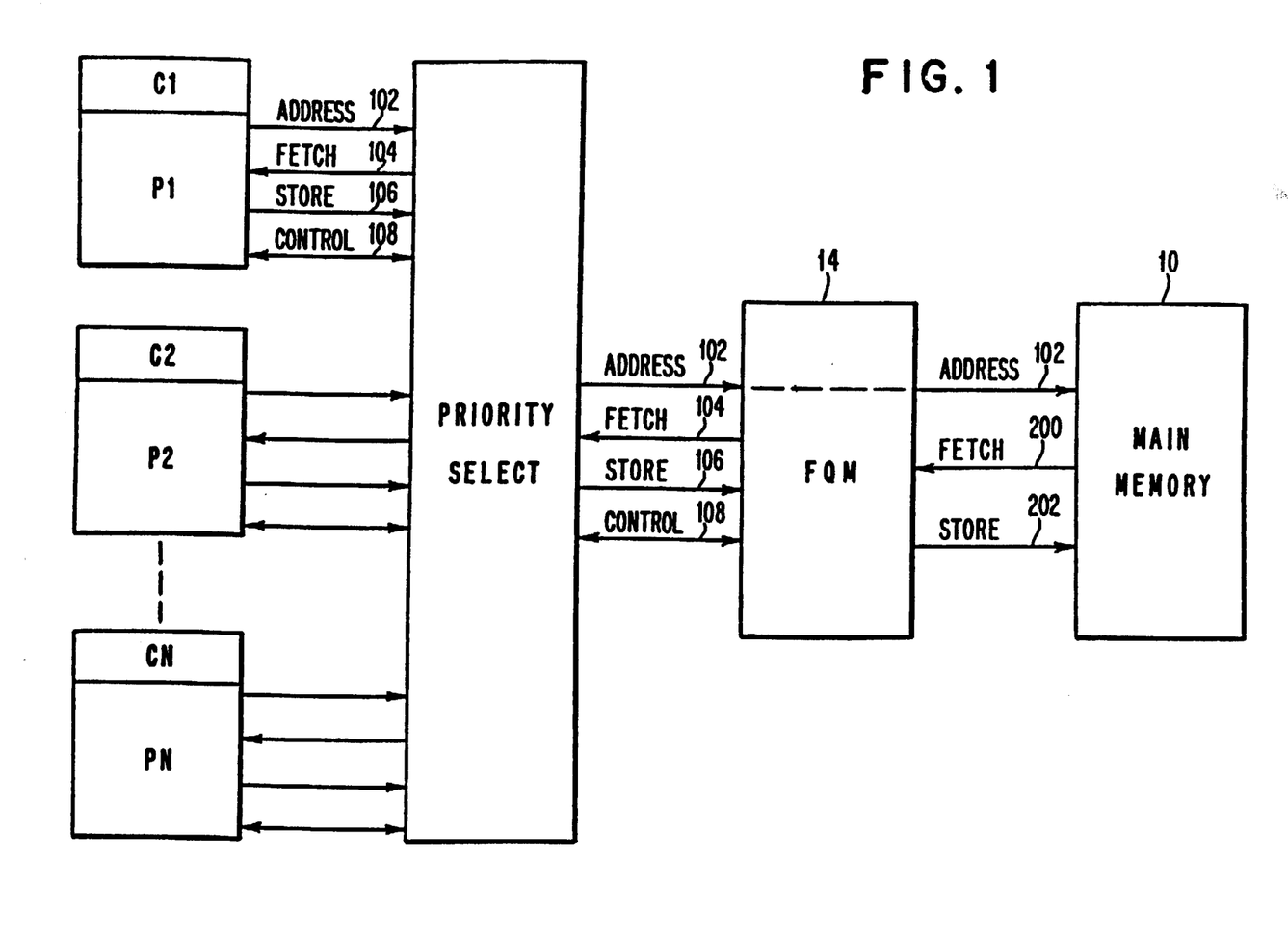
FIG. 1 is an overall block diagram of the invention.

Referring to FIG. 1, a data processing system is shown which includes a plurality of processors P1-Pn. Each processor is provided with an associated cache memory C1-Cn. All processors communicate with a main memory 10 through a priority select interface 12 and a fast queue mechanism 14.

Priority select interface 12, in the known manner, establishes the priority of communications between each of processors P1-Pn and main memory 10. For example, the priority rules may be as follows: first priority to fetch actions with processors P1-Pn being served in a round-robin fashion. i.e. from P1 to Pn and back to P1 etc. The second priority is to store actions, again in a round robin fashion. The lowest priority is allocated to memory update actions.

Each processor communicates with priority select interface 12 through four paths: address path 102, fetch path 104, store path 106, and control path 108. Identical paths exist between priority select interface 12 and fast queue mechanism 14, however serving only one processor in accordance with the selected priority. Between fast queue mechanism 14 and main memory 10, there exist three main signal paths, to wit: address path 102, fetch path 200 and store path 202. The functions attributed to each of those paths will be hereinbelow described.

Figure 2:
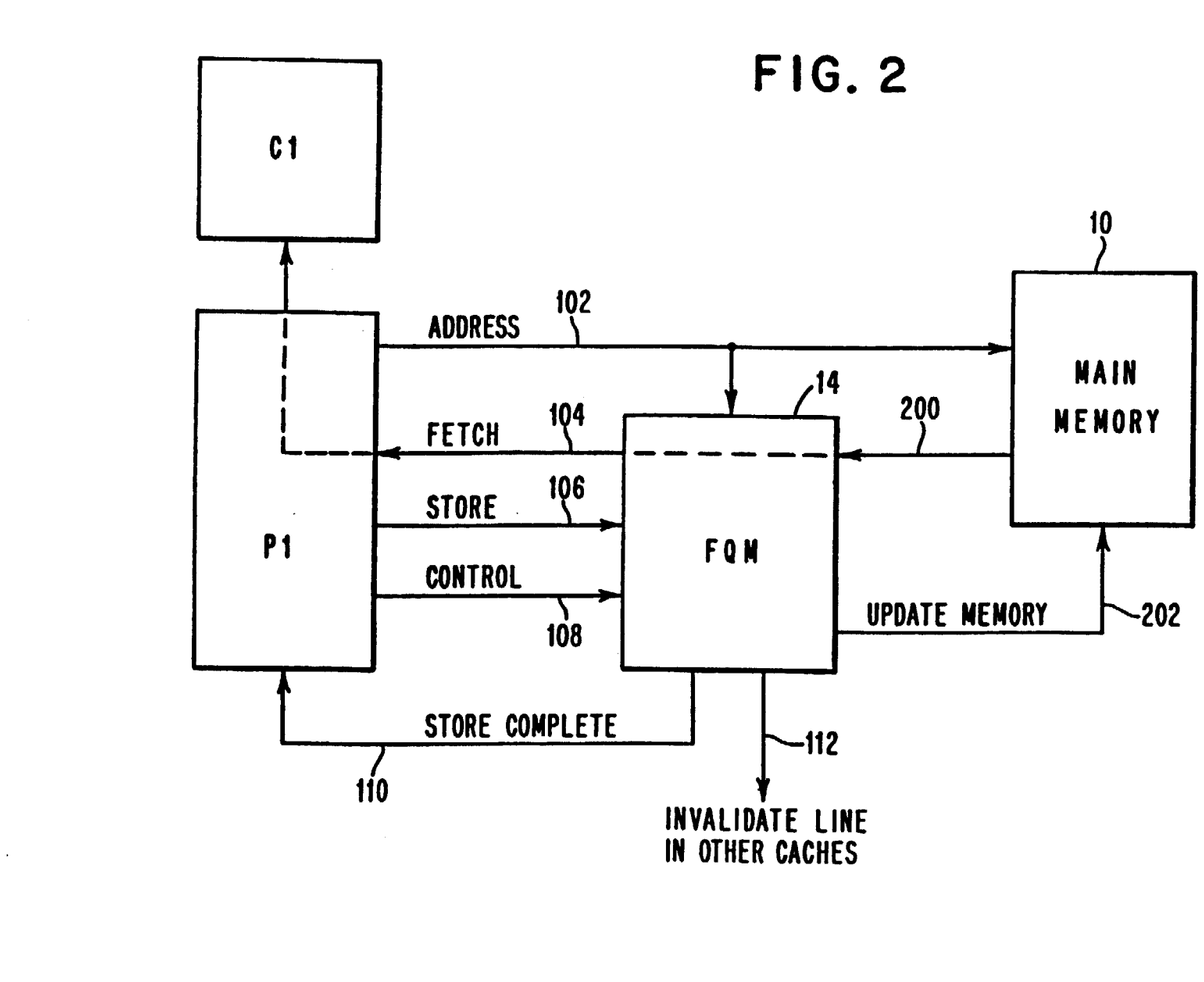
FIG. 2 is a block diagram of the principal interconnections between a processor and main memory with an interposed "fast queue mechanism".

Each of cache memories C1-Cn is of the store-through variety. Thus, when a processor wishes to store data, the data is sent both directly to main memory 10 and also to the cache associated with the processor. Referring to FIG. 2, the interconnections between a processor, fast queue mechanism 14 and main memory 10 are shown without the interposed priority select interface 12. Store actions by processor P1 are carried on store path 106 to fast queue mechanism(FQM)14 along with associated control signals on control path 108. The address associated with the store action (and other actions) is carried on path 102 to FQM 14. When a store action is completed in FQM 14, this completion is signaled back to processor P1 on path 110. At the same time, the signal on path 112 from FQM 14 causes lines in other caches (besides C1) bearing the same address to be invalidated.

FQM 14 also handles fetches from main memory 10 to a cache. Those fetches occur because a processor issues a fetch for a particular data line which is found not to be resident in its associated cache memory (a "cache-miss"). The data line to be fetched is addressed via path 102 and the fetched data from main memory 10 is returned to FQM 14 over path 200. Any changes to the data line that are held in FQM 14 are applied to the data line before it is sent onto the requesting processor via fetch path 104.

FQM 14 is a small, fast queue memory which maintains a list of data lines on a cache line basis. At any point in time there are relatively few cache lines that are being changed, therefore this list of cache lines may typically be small, e.g., 8 to 16 line entries. FQM 14 is organized on the basis of cache lines, a cache line being a packet of bytes, typically 64 or 128 bytes long. For the this description, FQM 14 will be assumed to have N entries, each entry holding the changes to a particular cache line of data. When all N entries are "active", i.e., holding changes, and a new data line is to be changed, it is necessary to move one entry out of FQM 14 to make room for the new entry. It is preferred to move the oldest entry out of the FQM 14, but in the alternative, a least-used entry may also be removed. The changes stored in the removed entry are used to update the corresponding data line in main memory 10. This is accomplished over path 202 and the address of the line to be updated is provided directly from the processor via line 102.

Figures 3, 3B:
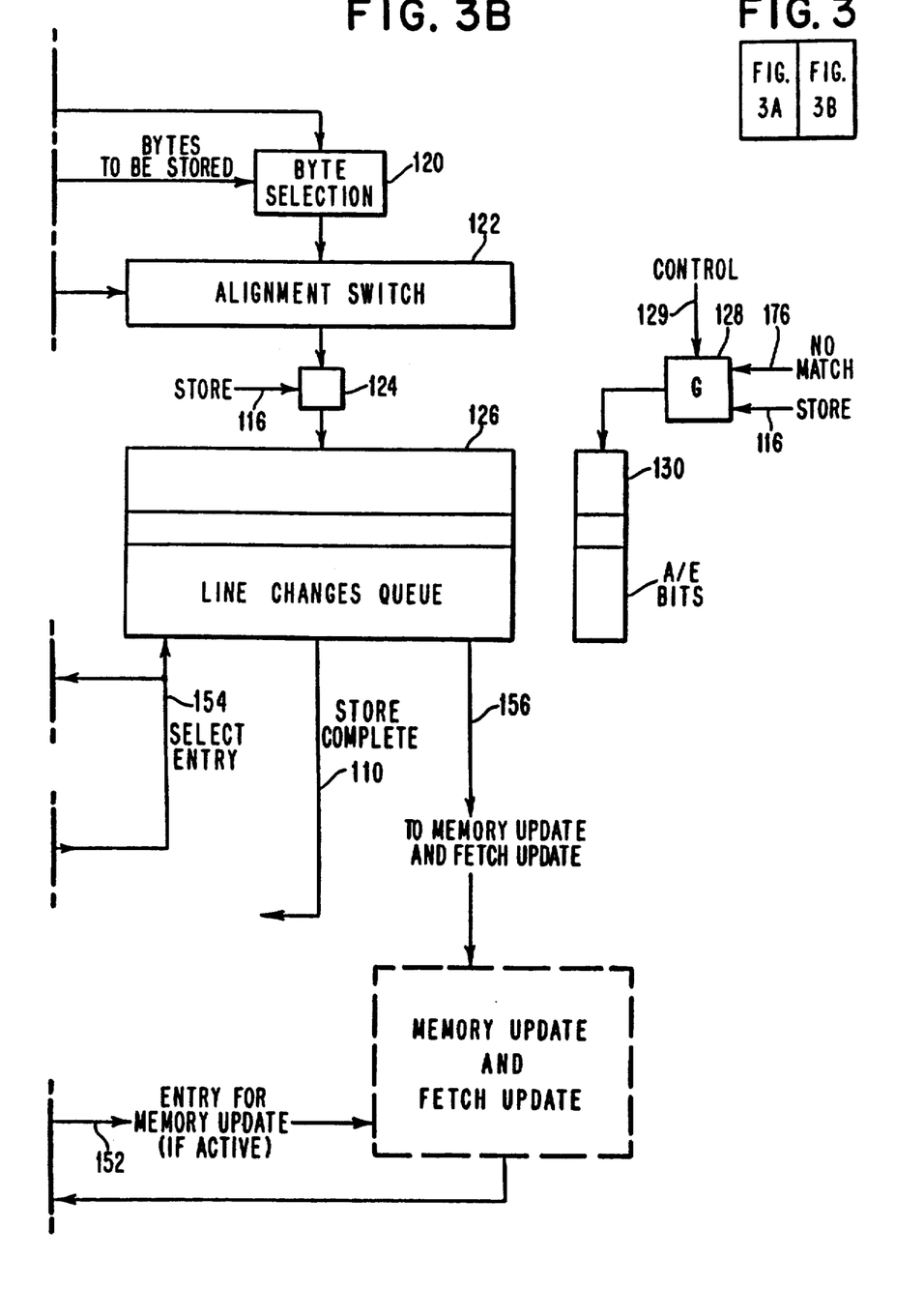
FIGS 3A and 3B show a detailed block diagram of the fast queue mechanism.
Figure 3A:
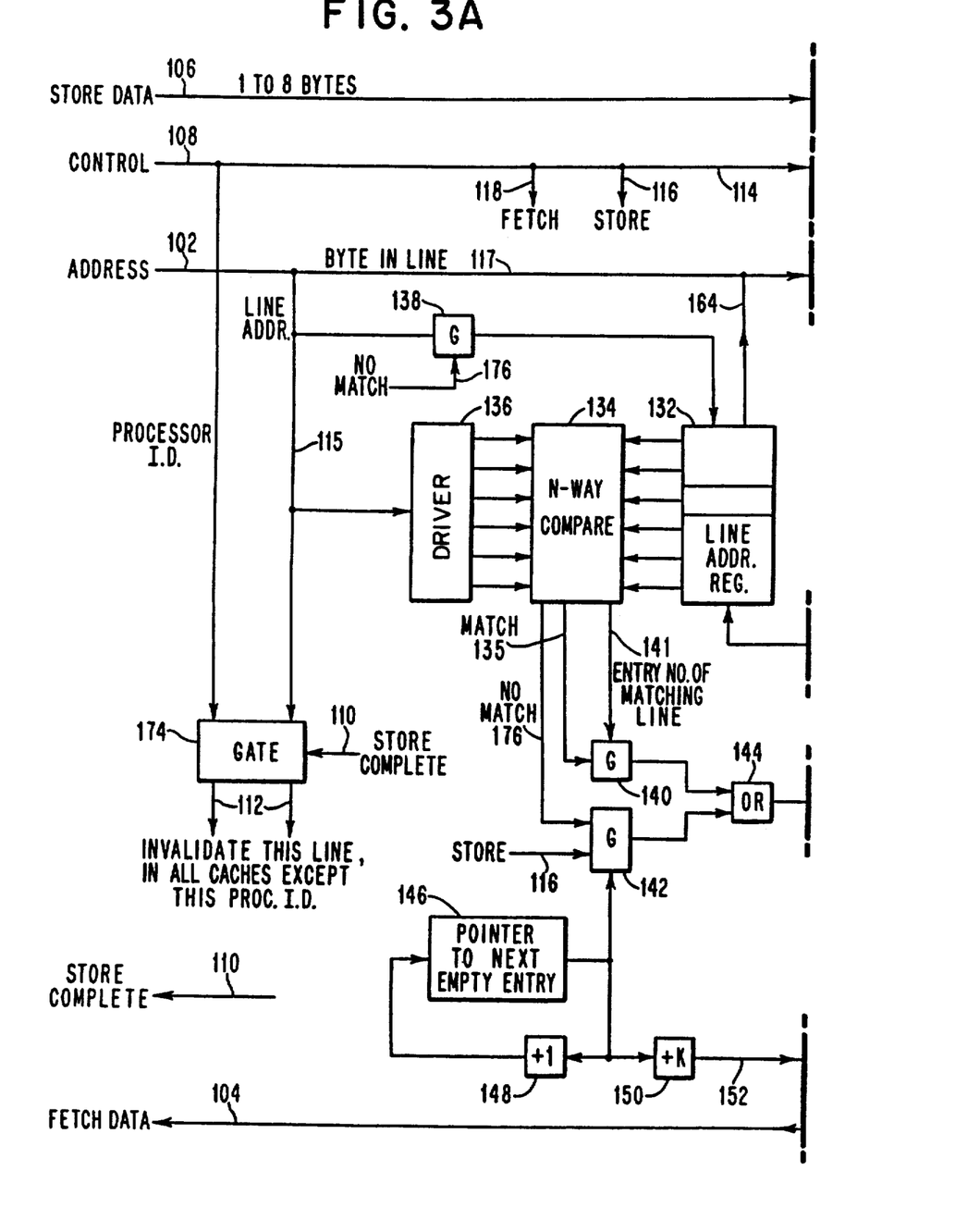
Figure 5:
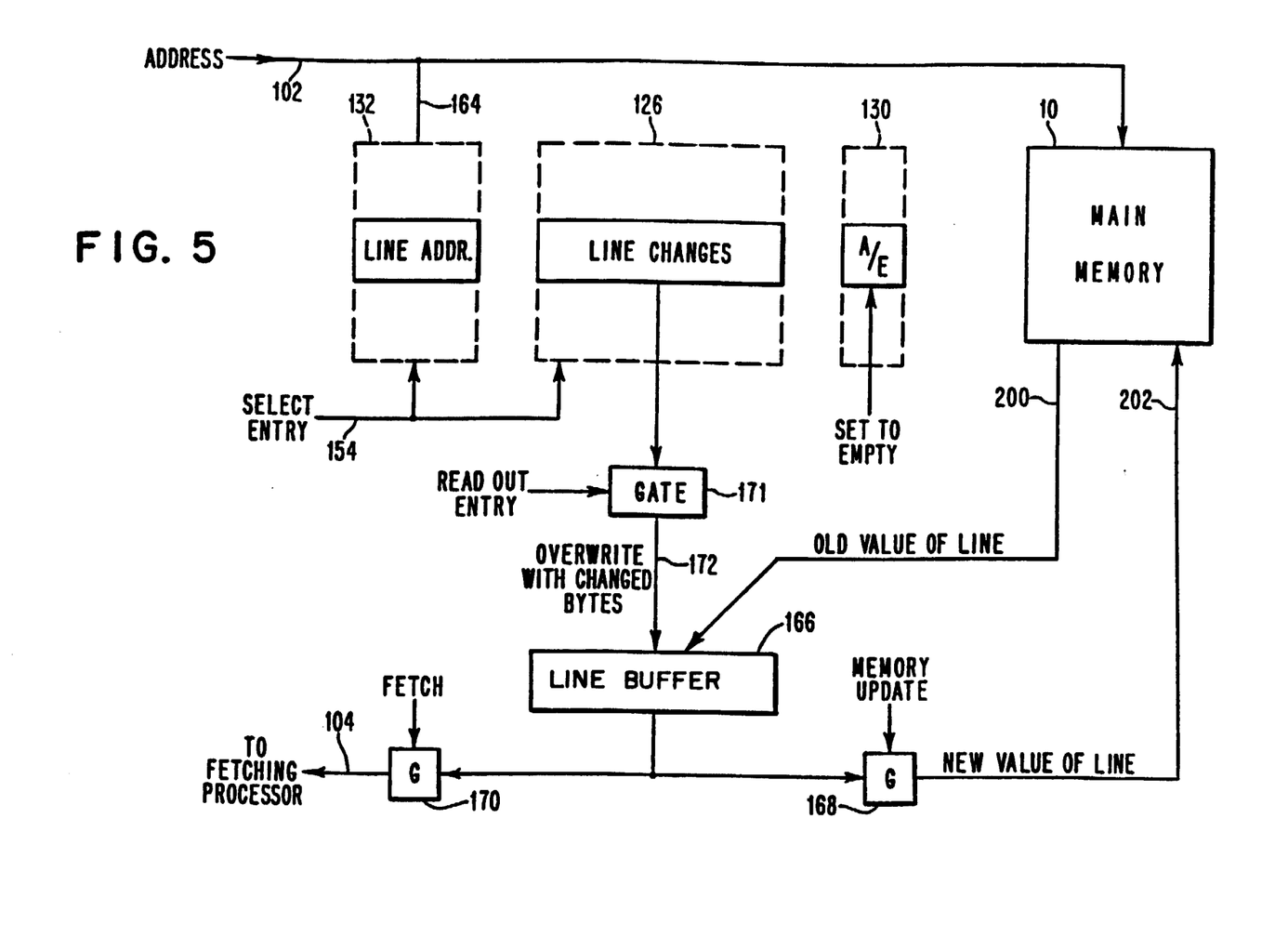
FIG. 5 is a block diagram illustrating main memory update and fetch update.

The detailed embodiment of FQM 14 is shown in FIGS. 3A, 3B, and 5. Referring first to FIGS. 3A and 3B, the principal interconnecting paths previously mentioned are shown to the left of the figure. The store data appears on store path 106, control signals on control path 108, address signals on path 102, a store complete signal on path 110 and data being fetched on fetch path 104. The description of operation of FQM 14 will be commenced using as an example, a store action. Depending upon the particular instruction, a store action may involve storing from one to a plurality of bytes (e.g. 1, 2, 4 or 8 bytes) so this information must be provided along with the address of where in main memory 10 the storing is to be accomplished.

Information on the number of bytes to be stored is received via control path 108 and is carried to byte selection gate 120 via path 114. The address of where in memory the storing is to be done appears on path 102. The address is separated into a line address and byte address with the line address emplaced on path 115. The byte address within the line is emplaced on path 117, where it is fed to alignment switch 122. The line address appearing on path 115 is applied to driver block 136 which drives the line address in parallel, to N-way compare block 134.

Fast queue mechanism 14 further includes line changes queue 126 which is a multi-line memory that stores the actual change data for each stored cache line. Line address register 132 maintains a listing of the addresses contained within line changes queue 126. The active entries in line address register 132 are applied to compare block 134, which signals, via line 135 whether the address of the store action matches or does not match one of the active addresses in line address register 132. If there is a match, line 135 enables gate 140. Similarly, upon the occurrence of a match, an entry number (a number from 1 to N) of the matching line in line changes queue 126 is provided to gate 140 via line 141. Since gate 140 is enabled, it forwards the entry number to OR circuit 144 and then onto path 154 to select the matching line entry in line changes queue 126. Thus, where a match is found, the data appearing on path 154 selects the particular line in line changes queue 126 into which storage is to occur.

If there is no match, indicating that line changes queue 126 does not contain the particular address into which data is to be stored, no match line 176 is raised thereby enabling gate 142. To accomodate the data to be stored, a new entry must be made in line changes queue 126. The entry number for this entry is given by the next empty entry pointer in register 146. The operation of register 146 will be explained below.

The pointer is applied to gate 142 which, having been enabled by no match signal 176 and a store signal 116 (derived from control path 108), passes the pointer data to OR circuit 144. The next empty entry number is thus placed on path 154 to select the next empty entry in line changes queue 126. Next empty entry pointer register 146 is advanced by one, to point to the next new empty entry, while a value of K is added to the pointer value to obtain a sum modulo N. That sum value identifies another entry in line changes queue 126 that will be used to update the corresponding line in main memory if the entry contains changed data. When the data line in main memory 10 is updated, the entry in line changes queue 126 is marked empty. If the identified entry did not include changed data, then it was already empty and no main memory line of updating is needed. The number K can be given a value of, for instance, N−3; this will then keep three empty entries in the line changes queue 126.

Figure 4:
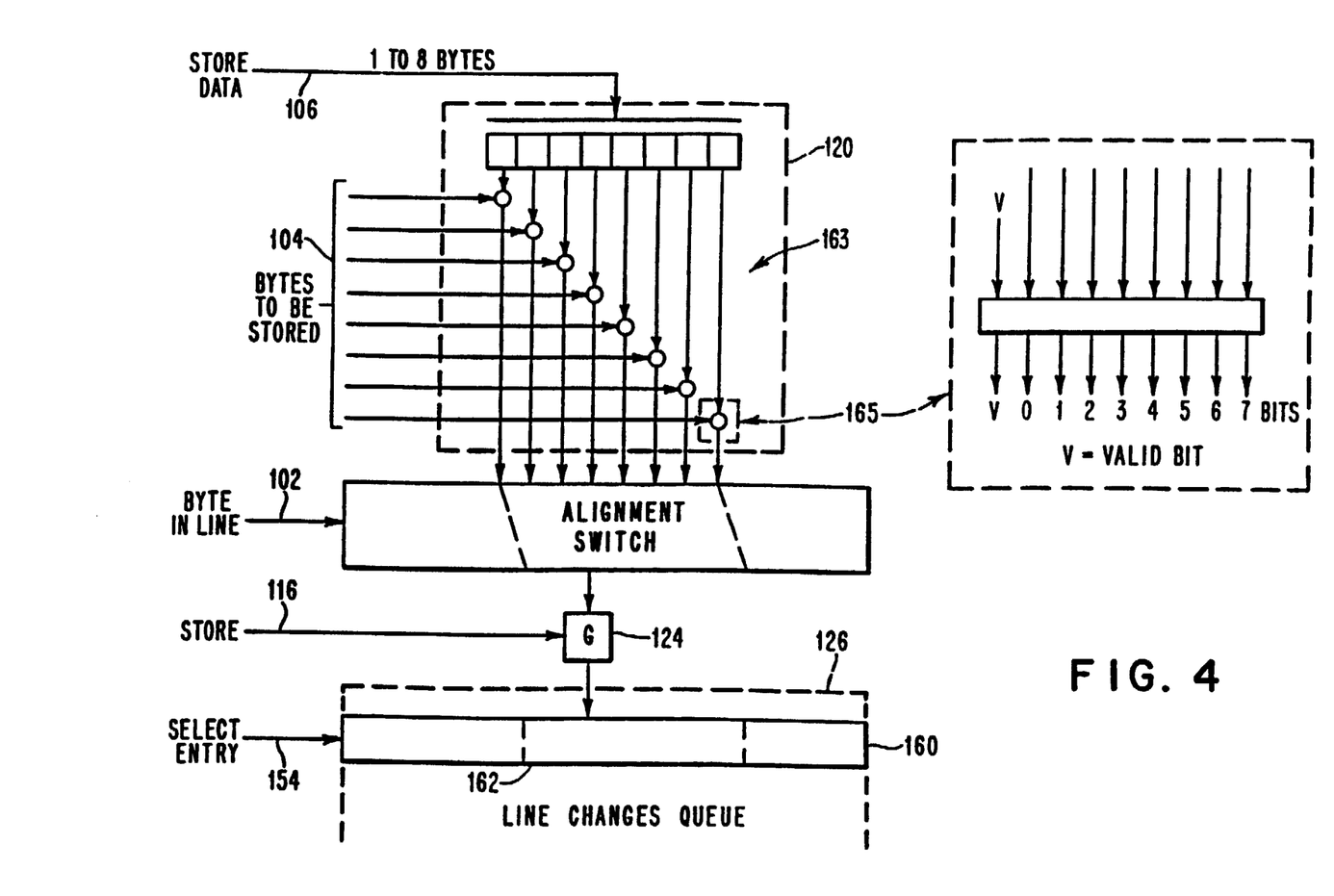
FIG. 4 is a block diagram of circuitry which selects bytes to be stored and the alignment of those bytes in the fast queue mechanism.

Referring now to FIG. 4, the select entry number on path 154 is applied to line changes queue 126. If it is assumed that the select entry indicates line entry 160, the gating circuitry thereinto (not shown) is conditioned to receive incoming data. The control information appearing on path 104 that indicates which byte or bytes are to be stored, condition from 1 to 8 of byte paths 163 to be opened to alignment switch 122. Within each gate circuit 165 in byte selection logic 120, a valid bit is inserted automatically as the byte data passes therethrough. This is shown in the detail inset to the right of FIG. 4.

The address on path 102 of the byte (or bytes) in the line of data causes alignment switch 122 to position the starting byte of the received data from path 106 to a proper byte address 162 in data line entry 160. Transfer of the selected and aligned bytes into data line entry 160 is controlled by a gating circuit 124 which is enabled by a store signal on the path 116. The bytes in data line entry 160 that are stored into may previously have been either valid or invalid. When valid, the new value of the byte replaces the old.

Returning to FIGS. 3A and 3B, if the entry in line changes queue 126 being stored into is a new entry, the corresponding Active/Empty bit appearing in status register 130 would have been in the Empty state. As the line is stored into, the corresponding bit in register 130 is set to the Active state by gate 128, which is, in turn, enabled by signals appearing on control line 129, store line 116, and no match line 176.

The completion of a store action into line changes queue 126 is signaled on path 110 by a store complete signal. That signal is sent back to the storing processor and is also used to enable gate 174. Gate 174 transmits the line address and the identification of the storing processor to all caches C1–Cn. If present, the line of data will be invalidated in all caches except that of the storing processor.

A fetch action occurs when a processor has a cache miss and must therefore fetch the missing line of data from main memory 10. That line of data may or may not be resident (be an entry) in line changes queue 126. If there is no entry, then the line in main memory 10 is up-to-date and the fetch can proceed in the usual way as will be described below. If there is an entry in line changes queue 126, then the line in main memory 10 is not up-to-date and the changes held in line changes queue 126 must be applied to the data line before that line is sent to the requesting processor.

Determining whether a line of data has an entry in line changes queue 126 is accomplished identically as with a store action. The address on path 102 is applied to driver block 136 and compared in parallel with the line addresses in line register 132. If there is a match, the entry number of the matching line is supplied to the line changes queue via gate 140, or circuit 144 and path 154. If there is no match, no entry is selected. Similarly, since this is not a store action, a signal on no-match line 176, does not pass through gate 142 since store line 116 is not set to condition gate 142.

Referring to FIG. 5, there is shown a block diagram of the elements of the system employed to assure that data being fetched includes the most updated information. If, as above stated, a match was found between an address in line address register 132 and a line address of data being fetched, the selected entry in line changes queue 126 is read out via gate 171 onto path 172. The readout entry enabling input to gate 171 is derived from select entry path 154.

Prior to entry readout through gate 171, the select entry on path 154 caused the line address to be read out of line address register 132 via path 164 to main memory 10. In response the old value is read out of main memory 10 via path 200 and placed in data line buffer 166. The changed bytes appearing on path 172 then overwrite the old byte values and the updated value is sent, via gate 170, to path 104 and thence to the fetching processor.

If there was no match, main memory 10 is still accessed, but the old (and correct) value of the line of data is fetched into line buffer 166. Since there are no changes, nothing is overwritten from path 172 and the unmodified line is sent to the fetching processor via gate 170 and path 104.

The updating of main memory 10, described briefly above, is performed in the same way as a fetch. The changes in the selected entry line of data in line changes queue 126 are used to overwrite the changed bytes in the old value of the line of data in line buffer 166. Then, instead of the updated line being sent to a requesting processor, the updated value is sent back to main memory 10 via gate 168 and path 202 to replace the old value of the line of data. The entry in the line changes queue 126 is no longer needed and the entry in active/empty register 130 can be set from active to empty, thereby making room in line changes queue 126 for a new entry.

From the above, it can be seen that the fast queue mechanism of this invention is adapted to update memory changes in an extremely fast and efficient manner. The FQM can create an updated record generally within a single machine cycle. By contrast, main memory, is very slow and may take from 10 to 20 cycles to store a single change. Therefore, the fast queue mechanism can be looked at as a surrogate for main memory to handle line data changes in a fast and effective manner.

It should be understood that the foregoing description is only illustrative of the invention. Various alternatives, and modifications can be devised by those skilled in the art without departing from the invention. Accordingly, the present invention is intended to embrace all such alternatives, modification and variances which fall within the scope of the appended claims.

We claim:

1. In a data processing apparatus which includes a main memory and a plurality of processor units, each with store through cache memory means, the combination comprising:

queue memory means interposed between said main memory and said processor units, with storage positions for storing a limited number of data units intended for storage in main memory;

comparison means coupled to said queue memory means and responsive to a newly received data unit to be stored at an address in main memory, which data unit may be received from any said processor unit, for indicating a presence of a data unit stored in said queue memory means which has a matching address;

means coupled to such queue memory means and responsive to said presence indication for modifying said stored data unit in said queue memory means to correspond to said newly received data unit;

means coupled to said queue memory means and responsive to no matching being found between the address of said newly received data unit and the addresses of data units stored in said queue memory means, to store said newly received data unit in said queue memory means;

means coupled to said comparison means for intercepting a fetch command to an address in main memory, said fetch command issued in response to a cache miss, and for providing said address in main memory to said comparison means;

read-out means responsive to a match indication between sad main memory address and an address in said queue memory means for reading out to a processor unit which issued said fetch command, a data unit in conformance with the data unit in said queue memory means at said matching address; and means for periodically transferring data unit from said queue memory means to said main memory.

2. The invention as defined in claim 1 wherein said transferring means further comprises:

means for removing data units stored in said queue memory means based upon predetermined criteria, and storing said removed data units at addresses in main memory which correspond to the addresses of said removed data units in said queue memory means.

3. The invention as defined in claim 2 further comprising:

status means for evidencing an active or empty state of each data unit storage position in said queue memory means.

4. The invention as defined in claim 3 further comprising:

means for altering said status means for a data unit storage position from which data is removed and stored in main memory by indicating an empty state for said storage position.

5. The invention as defined in claim 1 further comprising:

means responsive to a no-match indication for causing the data unit for which said fetch command was issued to be accessed from main memory and transferred to said requesting processor unit.

6. The invention as defined in claim 1 wherein said read-out means comprises:

register means for receiving a data unit from said main memory at said indicated address;

means for overwriting said received data unit with the data unit in said queue memory means having a matching address; and means for transmitting said overwritten data unit to said requesting processor unit.

7. The invention as defined in claim 6 further comprising:

means for updating main memory with said overwritten data unit.

8. The invention as defined in claim 7 further comprising:

status means for evidencing an active or empty state of each data unit storage position in said queue memory means.

9. The invention as defined in claim 8 further comprising: means for altering said status means to evidence an empty storage position in said queue memory means when data in that storage position is removed and stored in main memory.

10. In a data processing apparatus which includes a main memory and a plurality central processor with associated store-through cache memories, a fast queue mechanism interposed between said central processors and said main memory, said fast queue mechanism comprising:
- a queue memory having a plurality of lines of data storage, each line capable of storing a plurality of byte entries, each byte entry having a specific address;
- a line address memory for storing the address of entries in said queue memory;
- means for receiving a new entry and its associated address to be stored in said main memory from one of said central processor units;
- a compare circuit connected to said line address memory for determining if the address of said new entry matches a stored address in said line address memory, and generating a match signal if a match if found or a no-match signal if no match is found;
- circuit means responsive to a no-match signal for storing said new entry in a line of said queue memory and updating said line address memory accordingly, and further responsive to a match signal to alter the entry corresponding to said stored address to conform with said new entry;
- means for monitoring a fetch command to main memory, issued by a central processor in response to a cache-miss, and responsive to a determination by said compare circuit that data having an identical address to the data being fetched is present in said queue memory, to modify said fetched data from main memory to make said fetched data conform to the data stored in said queue memory.

11. The invention as recited in claim 10 further comprising:
- update circuit means for removing data from a line of storage in said queue memory, altering said line address memory and causing said removed data to be stored in main memory, said update circuit means operating in accordance with predetermined criteria relating to the status of use of the removed data in comparison with other data stored in said queue memory.

* * * * *

UNITED STATES PATENT AND TRADEMARK OFFICE
CERTIFICATE OF CORRECTION

PATENT NO. : 5,155,831
DATED : October 13, 1992
INVENTOR(S) : Emma et al

It is certified that error appears in the above-indentified patent and that said Letters Patent is hereby corrected as shown below:

Column 7, line 68, change "matching" to --match--.
Column 8, line 16, change "unit" to --units--.
Column 8, line 67, change "processor" to --processors--.
Column 9, line 17, change " if" to --is--.

Signed and Sealed this

Fourteenth Day of September, 1993

Attest:

BRUCE LEHMAN

Attesting Officer

Commissioner of Patents and Trademarks